UNITED STATES PATENT OFFICE.

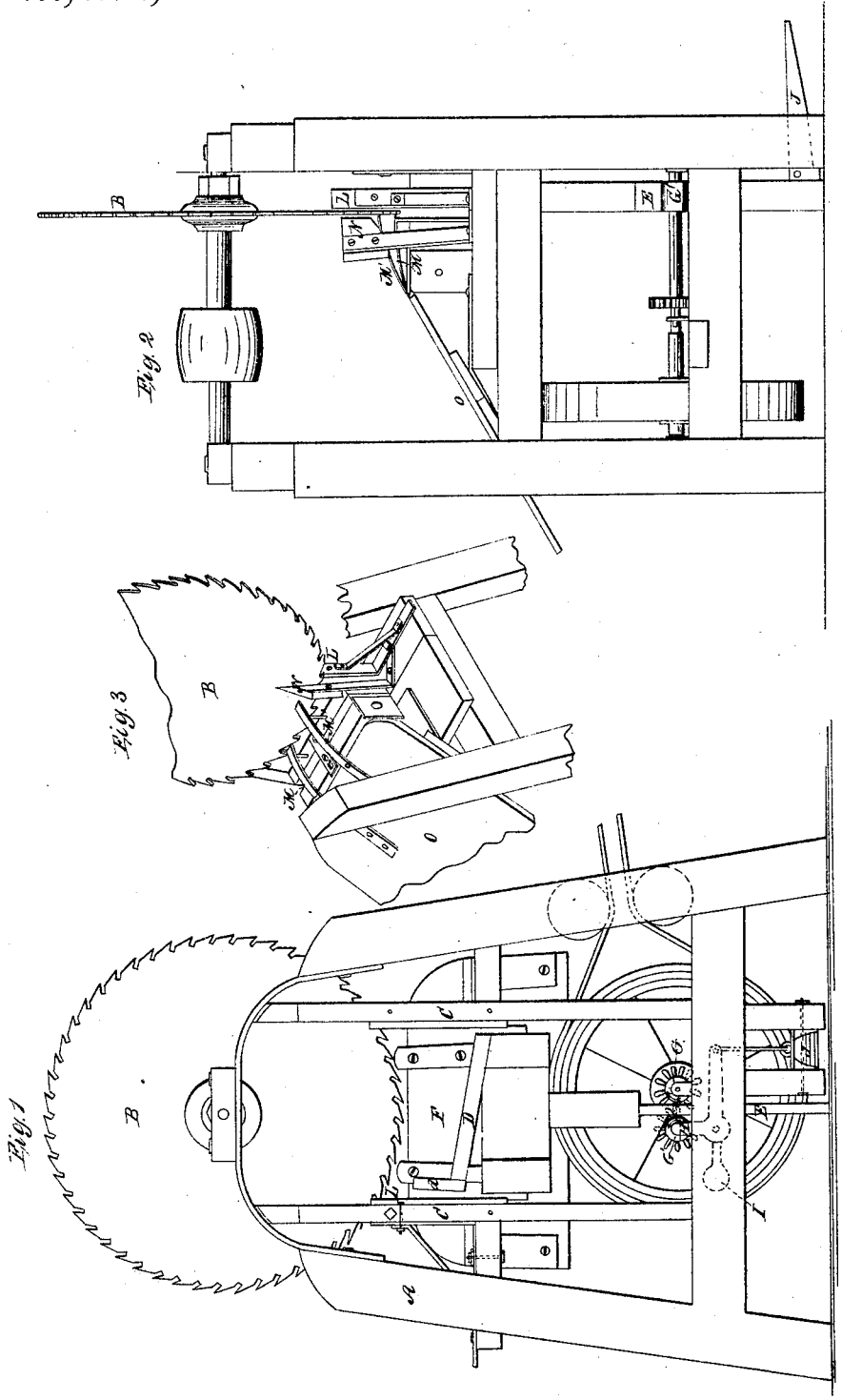
J. Creager,
Sawing Shingles,
N°21,744. Patented Oct. 12, 1858.

JONATHAN CREAGER, OF CINCINNATI, OHIO.

CIRCULAR-SAWING SHINGLE-MACHINE.

Specification of Letters Patent No. 21,744, dated October 12, 1858.

*To all whom it may concern:*

Be it known that I, JONATHAN CREAGER, of Cincinnati, Hamilton county, Ohio, have invented a new and useful Improvement in Shingle-Machines; and I hereby declare the following to be a full and exact description of the same, reference being had to the accompanying drawings, making part of this specification.

This invention relates to that class of shingle machines in which the bolt is fed by the operator to the action of a circular saw, worked by power, and consists, 1st, in a construction of feed rest by which the bolt or block is forwarded with a specific diagonal presentation to the saw so that the entire cut is in the direction of the grain; 2nd, in a device by which the power is made available for advancing the bolt to the action of the saw at the option of the operator; 3rd, in devices for insuring the proper discharge of the shingles.

A frame A supports at its upper part a circular saw B, which rotates in a vertical plane. C C are vertical stanchions which serve to guide the feed rest. The feed rest consists of a bench or table D and a stem or leg E. This table D is set at such an inclination as to present the top of the bolt or block at the end toward which the saw cuts, tangentially or nearly so to the periphery of the saw so that the saw although circular cuts in the direction of the grain at every part of the block.

The bench D, is, at its more elevated end, provided with a ledge *d*, which acts as a stop for the end of the block. The lower portion of the stem E is placed between two friction rolls G G made to revolve continuously in direction of the arrows. The forward journal bearing H of the roll G is capable of a slight lateral vibration, and is, in its normal position held with its roller slightly away from the stem E by a counter-balance I. When it is desired to elevate the feed rest, the depression of the treadle J by the foot of the operator, causes the rollers to hug the shank of the rest, and thus by communicating their motion to it to effect its elevation.

F is an adjustable rocking gage similar to that referred to in my patent of April 14th, 1857, as the "rocking rest *f*".

L is a bar to steady the periphery of the saw.

M M are two elastic fingers which support each shingle until displaced by its successor or by the motion of the saw, and thus prevent the shingle dropping back between the gage and the saw. These fingers may be steel springs as represented, or may consist of gravitating or spring latches. A wedge shaped piece N called the discharger serves to disengage the shingle from the saw and to throw it onto the sloping chute O.

The operation is as follows. The various adjustable parts being duly fixed in position and the saw being set in motion; a block or bolt to be converted into shingles, is placed on the rest D with its left end against the ledge *d* and its rear edge against the gage F. All being thus ready a pressure of the foot on the treadle J by bringing the rolls G G into play, effects the elevation of the feed rest, and the saw commencing at the upper left hand corner of the block, (being the end toward which it cuts) cuts its way diagonally through the block terminating at the lowermost right corner and all the time cutting downward or toward the grain, and in no part cutting upward or against the grain, as is the case where a block is presented laterally to a circular saw. A smooth surface is thus produced which is not liable to retain water so as to cause decay. A shingle being separated is caught by the fingers M M when a suspension of the foot pressure by the operator permits the descent of the rest and the work proceeds as before.

I claim as new and of my invention herein.

1. The feed rest D *d* E tangential to the saw at the end toward which the saw cuts, and having a motion parallel to the plane of the saw as set forth.

2. In this connection the feed rolls G G and their accessories, constructed to elevate the feed rest by power, under control of the operator as set forth.

3. The use in this connection of the elastic fingers M M as set forth.

In testimony of which invention I hereunto set my hand.

JONATHAN CREAGER.

Attest:
 GEO. H. KNIGHT,
 C. STEEMER.